(12) United States Patent
Goluboff

(10) Patent No.: US 10,034,118 B2
(45) Date of Patent: Jul. 24, 2018

(54) ZERO-TOUCH WI-FI

(71) Applicant: Lantronix, Inc., Irvine, CA (US)

(72) Inventor: Mariano Goluboff, Winchester, MA (US)

(73) Assignee: LANTRONIX, INC., Irvine, CA (US)

( * ) Notice: Subject to any disclaimer, the term of this patent is extended or adjusted under 35 U.S.C. 154(b) by 0 days.

(21) Appl. No.: 15/142,366

(22) Filed: Apr. 29, 2016

(65) Prior Publication Data

US 2016/0323689 A1    Nov. 3, 2016

Related U.S. Application Data

(60) Provisional application No. 62/155,257, filed on Apr. 30, 2015.

(51) Int. Cl.
| | |
|---|---|
| *H04M 3/00* | (2006.01) |
| *H04W 4/00* | (2018.01) |
| *H04W 12/06* | (2009.01) |
| *H04L 29/06* | (2006.01) |
| *H04W 4/50* | (2018.01) |
| *H04W 84/12* | (2009.01) |

(52) U.S. Cl.
CPC ........... *H04W 4/001* (2013.01); *H04L 63/083* (2013.01); *H04L 63/0823* (2013.01); *H04W 4/50* (2018.02); *H04W 12/06* (2013.01); *H04W 84/12* (2013.01)

(58) Field of Classification Search
None
See application file for complete search history.

(56) References Cited

U.S. PATENT DOCUMENTS

| | | |
|---|---|---|
| 2006/0267936 A1 | 11/2006 | Hoerl et al. |
| 2010/0071572 A1 | 3/2010 | Carroll et al. |
| 2012/0299721 A1 | 11/2012 | Jones |
| 2013/0286889 A1 | 10/2013 | Cherian et al. |
| 2013/0308493 A1 | 11/2013 | Viswanathan et al. |
| 2013/0317837 A1 | 11/2013 | Ballantyne et al. |
| 2014/0247943 A1 | 9/2014 | Harkins |
| 2015/0071052 A1* | 3/2015 | Hershberg ............ H04W 24/04 370/216 |
| 2015/0081898 A1 | 3/2015 | Grice et al. |
| 2015/0282223 A1* | 10/2015 | Wang .................. H04W 76/021 455/41.2 |
| 2015/0365217 A1* | 12/2015 | Scholten ............... H04L 5/0053 370/315 |
| 2016/0037436 A1* | 2/2016 | Spencer ................ H04W 48/12 370/338 |
| 2016/0044032 A1* | 2/2016 | Kim .................... H04L 63/0876 726/5 |
| 2016/0119284 A1* | 4/2016 | Kim ....................... H04L 63/02 726/12 |

FOREIGN PATENT DOCUMENTS

GB    2518620 A    4/2015

OTHER PUBLICATIONS

Rayment et al., "Achieving carrier-grade Wi-Fi in the 3GPP world", 2012, Ericsson, Ericsson Review 284 23-3183, Uen, pp. 2-3.

* cited by examiner

*Primary Examiner* — Erika Washington
(74) *Attorney, Agent, or Firm* — Lapple Ubell IP Law, LLP; Matthew C. Lapple

(57) ABSTRACT

A system and apparatus for remotely provisioning and operating a headless Wi-Fi IoT device is described that provides for automatic provision of the IoT device so as to connect the IoT device to a network.

17 Claims, 1 Drawing Sheet

ZERO-TOUCH WI-FI

PRIORITY

This application claims the benefit of and priority to U.S. Provisional Application, entitled "Zero-Touch Wi-Fi," filed on Apr. 30, 2015 having application Ser. No. 62/155,257.

BACKGROUND

The field of the present invention generally relates to network connections. More particularly, the field of the invention relates to a method and apparatus for remotely provisioning and operating a headless Wi-Fi-enabled "Internet of Things" device.

In the area of network computing, the term "provisioning" generally refers to the process of configuring a computer, or other network-compatible device, selecting an appropriate network, and establishing a connection to the network. A user interface (UI), or a human machine interface (HMI), stored on a computer, a phone, a laptop, or any other similar computing device, generally shows a user a list of available networks and enables the user to select a desired network to which to connect. The HMI further enables the user to enter a suitable username and password required for connecting the network, and then configure the network connection, if need be.

In this day and age, connecting to networks is far simpler than ever before, and many devices enable users to connect simply by selecting a network and entering a password. Connecting to a network becomes more complicated, however, when the device to be connected lacks any kind of HMI or user interface. Such a device is typically referred to as a "headless device." Those skilled in the art will appreciate that many headless devices may have one or more serial ports, and a common way of configuring the devices is by entering commands via the serial ports. Meanwhile, with Ethernet-enabled devices, connecting to a network may be as simple as plugging in an Ethernet cable. Alternatively, connecting a headless cellular device may often be accomplished with relative ease simply because a Subscriber Identification Module (that is, a SIM card) associated with the cellular device is already provisioned with the connection. In the case of Wi-Fi, however, every network has a different password and settings, which makes provisioning a headless Wi-Fi device without skilled user intervention very difficult, if not nearly impossible.

The advent of the Internet of Things, which envisions a connected world where appliances, such as, for example, an Internet connected thermostat such as the Nest® Thermostat, allow a user to monitor and/or control the appliance or device from anywhere in the world through the Internet. However, the appliance or device, hereinafter "the IoT" device, must be connected to a user's Wi-Fi network before it can be accessed over the Internet.

Provisioning the IoT device may not be simple, even where the IoT device has even a rudimentary interface. In many cases, however, the IoT device lacks a user interface such as a LCD display and/or keypad, and is thus considered a headless devices.

Various methods have been used by IoT device manufactures to provision the devices. For example, the IoT device may be capable of bringing up a Wi-Fi interface in access point mode, with a user using a browser on a computer or smartphone to navigate to a web page where the device may be provisioned. Such a method may require the user to know, and enter, an IP address and reboot the device.

In another method, an IoT device may allow for use of a Service Set Identifier (SSID) and password to facilitate connection to a Wi-Fi beacon. Such a method may be problematic, however, because a Wi-Fi beacon is not typically designed for such a use. There is typically a limit to the length of the password that a user can enter, and if the password of an access point or beacon is longer that the limit, the device cannot be configured. Moreover, such a method does not typically encrypt the data going over the air, which may expose the password to a snooper. Where encryption is enabled, each IoT device typically must be given a separate key for proper security.

While there are other methods that may be used that address most of these shortcomings, each method requires a user with a smartphone or a computer to be located in proximity to the device to effect the provisioning of the device. This may not be practical in all environments.

Another problem with current methods of deploying and provisioning IoT devices is that most users provision their IoT devices onto the Wi-Fi network that is used for the rest of their network. This is especially true where the device is being provisioned onto a home network. When deployed and provisioned in this matter, the IoT devices have access to the private network of the end user. Provisioning the devices in such a manner has the potential to expose confidential files in network shares if the security of the IoT device is breached.

Enterprises and end user can currently manage this problem by creating a separate "guest" Wi-Fi network for their IoT devices. However, such an arrangement creates overhead by the system administrator.

What has been needed, and heretofore unavailable, is a method and apparatus for provisioning and remotely operating Wi-Fi-enabled IoT devices without any need for a user interface or HMI to be installed on the devices. Moreover, it would be advantageous from a security standpoint to have a system where isolation from a local network is built into the system. Further, such a system and method should provide for provisioning of IoT devices without requiring that a user with a computer or smartphone be near the device. The present invention satisfies these and other needs.

SUMMARY OF THE INVENTION

In its most general aspect, the invention includes a method and an apparatus for automatically provisioning a headless Wi-Fi IoT device to communicate with a server by way of an access point configured to broadcast a designated IoT Service Set Identifier (SSID). The headless Wi-Fi IoT device may be any device capable of participating in wireless connections with various network access points within a multiplicity of infrastructure networks. Once the headless Wi-Fi IoT device connects with an access point, the access point provides a communication pathway to a server that then provisions the headless Wi-Fi IoT device with parameters to enable a Wi-Fi connection with the server. In some alternative aspects, the Wi-Fi connection between the headless Wi-Fi IoT device and the access point may be secured with an extended authentication protocol. In other aspects, the connection between the headless Wi-Fi IoT device and the server through a network associated with the access point may be configured to have limited access to the network so as to isolate the IoT from those portions of the network not involved in the communication link established between the headless Wi-Fi IoT device and the server.

In another aspect, the present invention includes a system for automatically provisioning a Wi-Fi enabled IoT device, comprising: an access point connected to a network with access to the Internet; an IoT device having a microcontroller and a Wi-Fi transceiver configured by software programming commands to connect to the access point; and a cloud server having a software application stored thereon, the software application consisting of programming commands for controlling a processor associated with the cloud server to provide values of configuration parameters of the access points to authenticate the IoT device through the access point to establish a wireless connection between the IoT device and the cloud server.

In yet another aspect, the access point is configured to broadcast an IoT designated SSID. In still another aspect, the microcontroller of the IoT device is configured to search for the IoT designated SSID and transmit a password associated with the IOT designated SSID to the access point. In one alternative aspect, the SSID is hidden.

In a further aspect, the microcontroller is configured to search for the designated IoT SSID when the IoT is connected to a power supply. In yet another further aspect, the access point and the IoT is secured using an extended authentication protocol. In one alternative aspect, the extended authentication protocol is EAP-TLS. In another alternative aspect, the IoT is configured to operate in accordance with an X.509 certificate for encryption and authentication.

In still another aspect, the access point is operably connected with the cloud server through a local area network. In another aspect, the access point is configured to establish a limited access connection between the cloud server and IoT device which isolates the IoT connection from selected portions of the LAN.

In yet another aspect, the present invention includes a method for automatically provisioning a headless Wi-Fi IoT device, comprising: connecting a headless Wi-Fi IoT device to a power supply; searching, by the headless Wi-Fi IoT device, for an access point that is broadcasting a designated IoT SSID; transmitting, by the headless Wi-Fi IoT device in response to discovering an access point broadcasting the designated IoT SSID, a password associated with the IoT designated SSID; and provisioning, by a server in operable communication with the access point, the headless Wi-Fi IoT device. A further aspect of the invention includes establishing a communication link between the server and the headless Wi-Fi IoT device in accordance with configuration parameters provided during the provisioning of the headless Wi-Fi IoT device.

In another further aspect, the invention includes securing the communication link using an extended authentication protocol. In one alternative aspect, the extended authentication protocol is EAP-TLS. In still another alternative aspect, securing the communication link includes using an encryption and authentication certificate provided by the headless Wi-Fi IoT device. In one alternative aspect, the certificate is an X.509 certificate.

In yet another further aspect, the invention includes limiting the communication link between the headless Wi-Fi IoT device and the server to isolate the headless Wi-Fi IoT device from portions of a local area network connected to the access point not dedicated to providing the communication link between the headless Wi-Fi IoT device and the server.

Other features and advantages of the present invention will become apparent from the following detailed description, taken in conjunction with the accompanying drawings, which illustrate, by way of example, the principles of the invention.

DETAILED DESCRIPTION OF THE PREFERRED EMBODIMENTS

Figure 1:
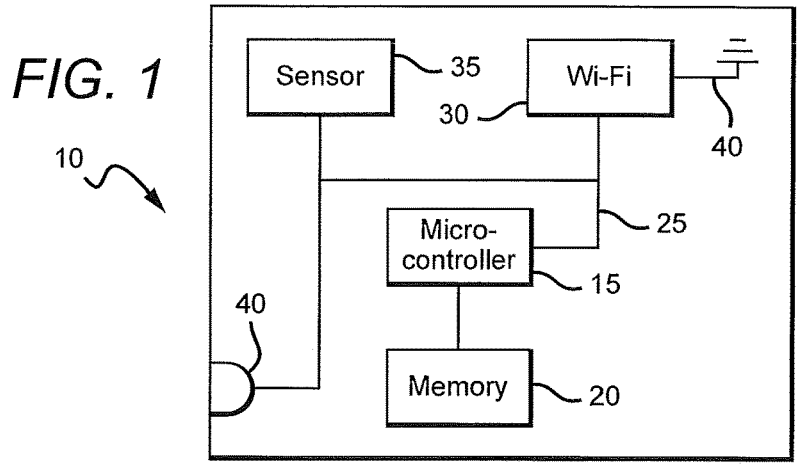
FIG. 1 is a schematic representation of an exemplary IoT device.

As will be described hereinafter in greater detail, the various embodiments of the present invention relate to an apparatus and method for provisioning and remotely operating a headless Wi-Fi IoT device that has no UI or HMI for controlling the IoT device. For purposes of explanation, specific nomenclature is set forth to provide a thorough understanding of the present invention. Description of specific applications and methods are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

In the following description, numerous specific details are set forth in order to provide a thorough understanding of the present invention. It will be apparent, however, to one of ordinary skill in the art, that the present invention may be practiced without these specific details. In other instances, well known components or methods have not been described in detail but rather in a block diagram, or a schematic, in order to avoid unnecessarily obscuring the present invention. Further specific numeric references such as "first driver," may be made. However, the specific numeric reference should not be interpreted as a literal sequential order but rather interpreted that the "first driver" is different than a "second driver." Thus, the specific details set forth are merely exemplary. The specific details may be varied from and still be contemplated to be within the spirit and scope of the present invention. The term "coupled" is defined as meaning connected either directly to the component or indirectly to the component through another component.

Throughout the description reference will be made to various software programs and hardware components that provide and carryout the features and functions of the various embodiments of the present invention. Software programs may be embedded onto a machine-readable medium. A machine-readable medium includes any mechanism that provides, stores or transmits information in a form readable by a machine, such as, for example, a computer, server or other such device. For example, a machine-readable medium includes read only memory (ROM); random access memory (RAM); magnetic disk storage media; optical storage media; flash memory devices; digital video disc (DVD); EPROMs; EEPROMs; flash memory; magnetic or optical cards; or any type of media suitable for storing electronic instructions.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, do not refer to the action and processes of a general purpose computer system, or similar electronic computing device. Rather, in the context of the below description, such terms relate to processes carried out by a computer or similar electronic computing device that manipulates and transforms data represented as physical (electronic) quantities within the computer system's registers and memories into other data similarly represented as physical quantities within the computer system memories or registers, or other such information storage, transmission or display devices, under the control of embedded or software programming commands specifically designed to carry out the specific functions of the various embodiments of the invention.

In an embodiment, the logic consists of electronic circuits that follow the rules of Boolean Logic, software that contain patterns of instructions, or any combination of both.

The term "server" is used throughout the following description. Those skilled in the art understand that a server is a computer program that provides services to other computer programs running on the same computer or processor as the server application is running, and/or other computers or processors different from the computer or processor on which the server is running. Often, the computer or processor on which the server program is running is referred to as the server, although other programs and applications may also be running on the same computer or processor. It will be understood that a server forms part of the server/client model. As such, the processor running the server program may also be a client, requesting services from other programs, and also operate as a server to provide services to other programs upon request. It is understood that the computer or processor upon which a server program is running may access other resources, such as memory, storage media, input/output devices, communication modules and the like.

Similarly, a cloud server is a server that provides shared services to various clients that access the cloud server through a network, such as a local area network and the Internet. In a cloud based system, the server is remote from the clients, and various clients share the resources of the cloud server. Information is passed to the server by the client, and returned back to the client through the network, usually the Internet.

The Internet of Things is a network of physical objects or "things" embedded with electronics, software, sensors and connectivity to enable it to be deployed in such a manner as to allow for control or data acquisition of each device over the Internet. Importantly, each device is uniquely identifiable through its embedded computing system.

IoT devices can refer to a wide variety of devices such as heart monitoring implants, biochip transponders on farm animals, automobiles with built-in sensors, appliances, lights, home controllers or other applications. Such devices collect useful data with the help of various existing technologies and then autonomously flow the data between other devices, and may also be remotely controlled and/or monitored by users by way of the Internet, Cloud, Wi-Fi networks, and the like. One example of such an IoT device is a smart thermostat system distributed by Nest®; another example is a washer/dryer sold by Samsung® that is connectable to the Internet utilizing Wi-Fi for remote monitoring and control of the operation of the washer/dryer.

FIG. 1 is a schematic representation of an exemplary IoT device 10. IoT device 10 typically includes a microcontroller 15 and an associated memory 20. Communication bus 25 provides for communication between the microcontroller 15 and Wi-Fi transceiver 30, sensor 35 and input/output port 40. Microcontroller 15 is typically operated under the control of programming commands embodied in firmware, which may be stored in memory 20, or in a memory embedded in microcontroller 15. An antenna 40 will generally be used for transmitting and receiving Wi-Fi signals from and to Wi-Fi transceiver 30.

Those skilled in the art will understand that the microcontroller and Wi-Fi transceiver may be incorporated into a single chip design, or they may be separate chips. A source of power, such as a battery or additional circuits designed to accept 120 volt AC and convert it to a voltage and type of current, for example, direct current, that can be used by the circuitry of the IoT device 10, may be used to power the device.

The IoT device 10 may also have an on-board sensor, such as, for example, a temperature sensor, a gyroscope or accelerometer for sensing motion, or other sensors as desired by the designer of the IoT device. Additionally, the IoT device may also include an input/output port for attaching additional external sensors, or for providing communication access to the device using a wired connection.

Figure 2:
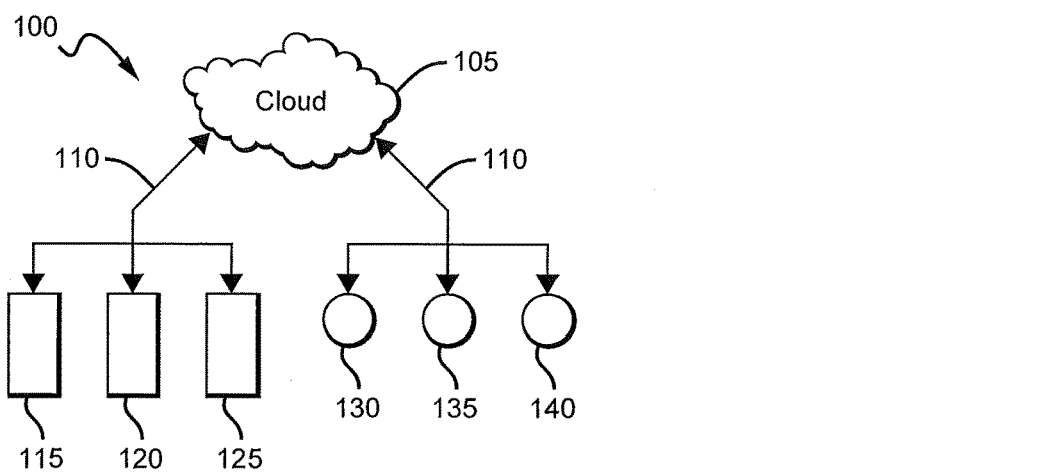
FIG. 2 is a graphic representation of one embodiment of a system according to the present invention illustrating the use of remote devices communicating through a cloud server to monitor and/or control several IoT devices.

FIG. 2 is a schematic representation of a system 100 illustrating several IoT devices 115, 120, and 125 wirelessly connected to a cloud server 105 through a network/Internet connection 110. Also shown are a plurality of devices such as a smartphone 130, a computer 135, and an internet enabled device 140 that are also connected, either wirelessly or wired, to the cloud 130 through Internet/network 110.

As discussed above, for devices 130, 135, and 140 to be able to monitor and/or control IoT devices 115, 120, 125 through the Internet/network, IoT devices 115, 120, and 125 must be provisioned correctly to be able to wirelessly connect to a Wi-Fi access point. Prior art IoT devices have been required to be manually provisioned in such a manner that a user needed to be near the IoT device to effect the provisioning of the device. While this mode of provisioning may be acceptable where the user is expected to be close by and interact with the device immediately, such a deployment is problematic when the IoT is to be deployed in an enterprise or industrial environment. For example, providing a technician to provision the devices each time a device is added to a large network raises costs and creates logistical deployment issues.

Figure 4:
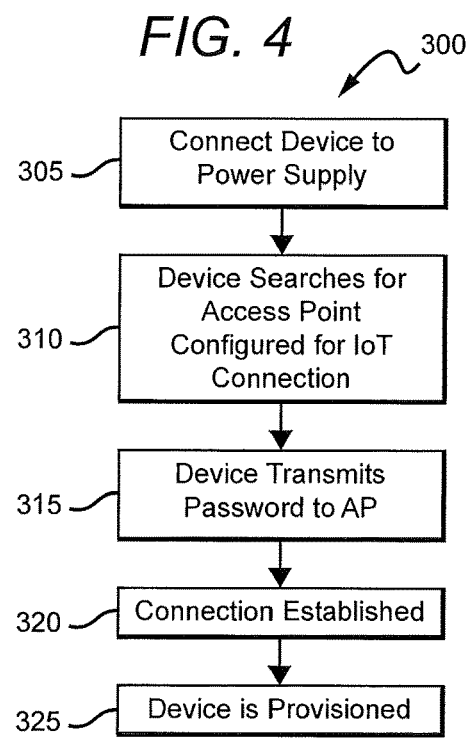
FIG. 4 is a block diagram of one embodiment of the present invention illustrating a method for automatically provisioning an IoT device.

The various embodiments of the present invention thus include hardware and software configured to provide for zero-touch deployment of an IoT device. In one embodiment of the invention, as shown in FIG. 4, the microprocessor of an IoT device is controlled by software programming commands to enable remote/automatic provisioning of the device when it is connected to a power supply at box 305. Once the microprocessor powers ups, it begins searching for an access point configured for IoT connection in box 310.

If an access point configured for IoT connection is discovered in box 310, the microcontroller of the IoT device transmits a password to the access point to establish a communication session with the access point. It is contemplated that an access point configured for IoT connection may have a standard SSID designated for IoT devices. The microcontroller searches from an access point broadcasting that SSID, and upon its discovery, then initiates a connection with the access point.

In some embodiments, the SSID may be hidden to reduce confusion for casual consumers using other devices within range of the access point. In some embodiments, the connection between the IoT device and the access point may be secured with an extensible authentication protocol, such as EAP-TLS, with the IoT having an appropriate securing certificate, such as an X.509 certificate, for encryption and authentication.

In another embodiment, the IoT device may include software programming commands that enable it to connect through the access point to a designated cloud server associated with the IoT device. This embodiment provides for a cloud-based configuration system to see that the device has been deployed and is communicating configuration information. The cloud server may be configured to be dependent on service information that is either contained on extensions of the certificate of the IoT device or the service information may be pre-negotiated.

Figure 3:
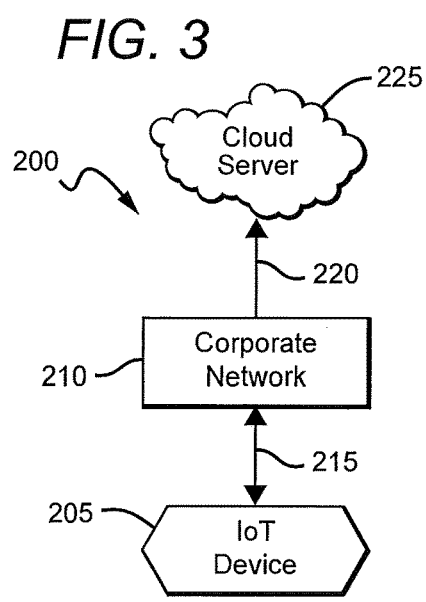
FIG. 3 is a graphic representation of a system illustrating an embodiment of the present invention showing a secure communication link between an IoT and a dedicated IoT cloud server through a corporate network.

FIG. 3 illustrates another embodiment of the present invention wherein the architecture of the connection between the IoT device and a cloud server provides access to the cloud server while isolating the IoT device from both the rest of the Internet as well as the local area network (LAN) to which the IoT device is connected. For example, IoT device 205 is connected to corporate network 210 using Wi-Fi connection 215. As discussed above, this connection may be secured using an extended authentication protocol such as EAP-TLS.

The access point for corporate network 210 broadcasts an SSID that is unique to connections with IoT devices, and that SSID is searched for by IoT device 205. When IoT device 205 discovers that unique SSID, the access point of the corporate network 210 may establish a limited connection with the IoT device that provides for a shielded connection through an Internet/network connection 220 to cloud server 225. This shielded connection is configured to only allow communication through the corporate network directly to the cloud server. In this manner, IoT device 205 is isolated from the corporate network, and the remainder of the Internet. This provides enhanced security from compromised IoT devices. In the case where the IoT device does need access to resources within the corporate network, the cloud server can provision the IoT device through the IoT network with details of another Wi-Fi network in the LAN that provides full access to the resources or the remainder of the internet.

While particular embodiments of the present invention have been described, it is understood that various different modifications within the scope and spirit of the invention are possible. The invention is limited only by the scope of the appended claims.

I claim:

1. A system for automatically provisioning a Wi-Fi enabled Internet of Things ("IoT") device, comprising:
   an access point connected to a network with access to the Internet;
   an IoT device having a microcontroller and a Wi-Fi transceiver configured by software programming commands to connect to the access point; and
   a cloud server having a software application stored thereon, the software application consisting of programming commands for controlling a processor associated with the cloud server to provide values of configuration parameters of the access point to authenticate the IoT device through the access point to establish a wireless connection between the IoT device and the cloud server;
   wherein the access point is configured to broadcast an IoT designated Service Set Identifier ("SSID");
   wherein the microcontroller of the IoT device is configured to search for the IoT designated SSID and transmit a password associated with the IOT designated SSID to the access point; and
   wherein the microcontroller is configured to search for the designated IoT SSID when the IoT device is connected to a power supply.

2. The system of claim 1, wherein the wireless connection between the access point and the IoT device is secured using an extended authentication protocol.

3. The system of claim 2, wherein the extended authentication protocol is Extended Authentication Protocol-Transport Layer Security ("EAP-TLS").

4. The system of claim 2, wherein the IoT device is configured to operate in accordance with an X.509 certificate for encryption and authentication.

5. The system of claim 1, wherein the access point is operably connected with the cloud server through a local area network.

6. The system of claim 5, wherein the access point is configured to establish a limited access connection between the cloud server and IoT device which isolates the IoT connection from selected portions of the LAN.

7. The system of claim 1, wherein the SSID is hidden.

8. A method for automatically provisioning a headless Wi-Fi IoT device, comprising:
   connecting a headless Wi-Fi IoT device to a power supply;
   searching, by the headless Wi-Fi IoT device, for an access point that is broadcasting a designated IoT SSID;
   transmitting, by the headless Wi-Fi IoT device in response to discovering an access point broadcasting the designated IoT SSID, a password associated with the IoT designated SSID;
   provisioning, by a server in operable communication with the access point, the headless Wi-Fi IoT device;
   establishing a communication link between the server and the headless Wi-Fi IoT device in accordance with configuration parameters provided during the provisioning of the headless Wi-Fi IoT device; and securing the communication link using an extended authentication protocol.

9. The method of claim 8, wherein the extended authentication protocol is EAP-TLS.

10. The method of claim 9, wherein the certificate is an X.509 certificate.

11. The method of claim 8, wherein securing the communication link includes using an encryption and authentication certificate provided by the headless Wi-Fi IoT device.

12. The method of claim 8, further comprising limiting the communication link between the headless Wi-Fi IoT device and the server to isolate the headless Wi-Fi IoT device from portions of a local area network connected to the access point not dedicated to providing the communication link between the headless Wi-Fi IoT device and the server.

13. A Wi-Fi-enabled Internet of Things ("IoT") device, comprising a microcontroller and a Wi-Fi transceiver configured by software programming commands to:

upon connection to a power supply, search for a designated IoT Service Set Identifier ("SSID"), wherein the designated IoT SSID is wirelessly broadcast by an access point;

upon detecting the access point, transmit a password associated with the IoT designated SSID to the access point;

establish a wireless connection to the access point;

provision the IoT device by receiving and responding to a set of values of configuration parameters of the access point to authenticate the IoT device through the access point, wherein the set of values is provided to the access point via an operative connection to a remote cloud server;

establish an operative connection between the IoT device and the remote cloud server; and wherein the wireless connection between the access point and the IoT device is secured using an extended authentication protocol.

14. The IoT device of claim 13, wherein the extended authentication protocol is EAP-TLS.

15. The IoT device of claim 13, wherein the IoT device is configured to operate in accordance with an X.509 certificate for encryption and authentication.

16. The IoT device of claim 13, wherein the access point is operably connected with the cloud server through a local area network.

17. The system of claim 16, wherein the access point is configured to establish a limited access connection between the cloud server and IoT device which isolates the IoT connection from selected portions of the LAN.

* * * * *